INVENTOR.
JOHN E. HENCH
BY Roland A. Anderson
ATTORNEY

United States Patent Office 3,395,075
Patented July 30, 1968

3,395,075
COOLING SYSTEM IN A NUCLEAR REACTOR
UTILIZING CONCRETE PRESSURE VESSEL
John E. Hench, San Jose, Calif., assignor to the United
States of America as represented by the United States
Atomic Energy Commission
Filed Oct. 19, 1966, Ser. No. 588,673
6 Claims. (Cl. 176—61)

ABSTRACT OF THE DISCLOSURE

A cooling system for a nuclear reactor which utilizes a prestressed reinforced concrete pressure vessel wherein an even temperature distribution within and along the inner surface of the pressure vessel is maintained, the temperature being compatible with the reinforced concrete. This is accomplished by introducing coolant into the reactor core region through a permeable material barrier disposed between the core and the concrete containment vessel such that the coolant flow is in a direction counter to the flow of the heat from the core through barrier, whereby the pressure vessel inner surface is contacted only by relatively cold coolant.

---

Figure 1:
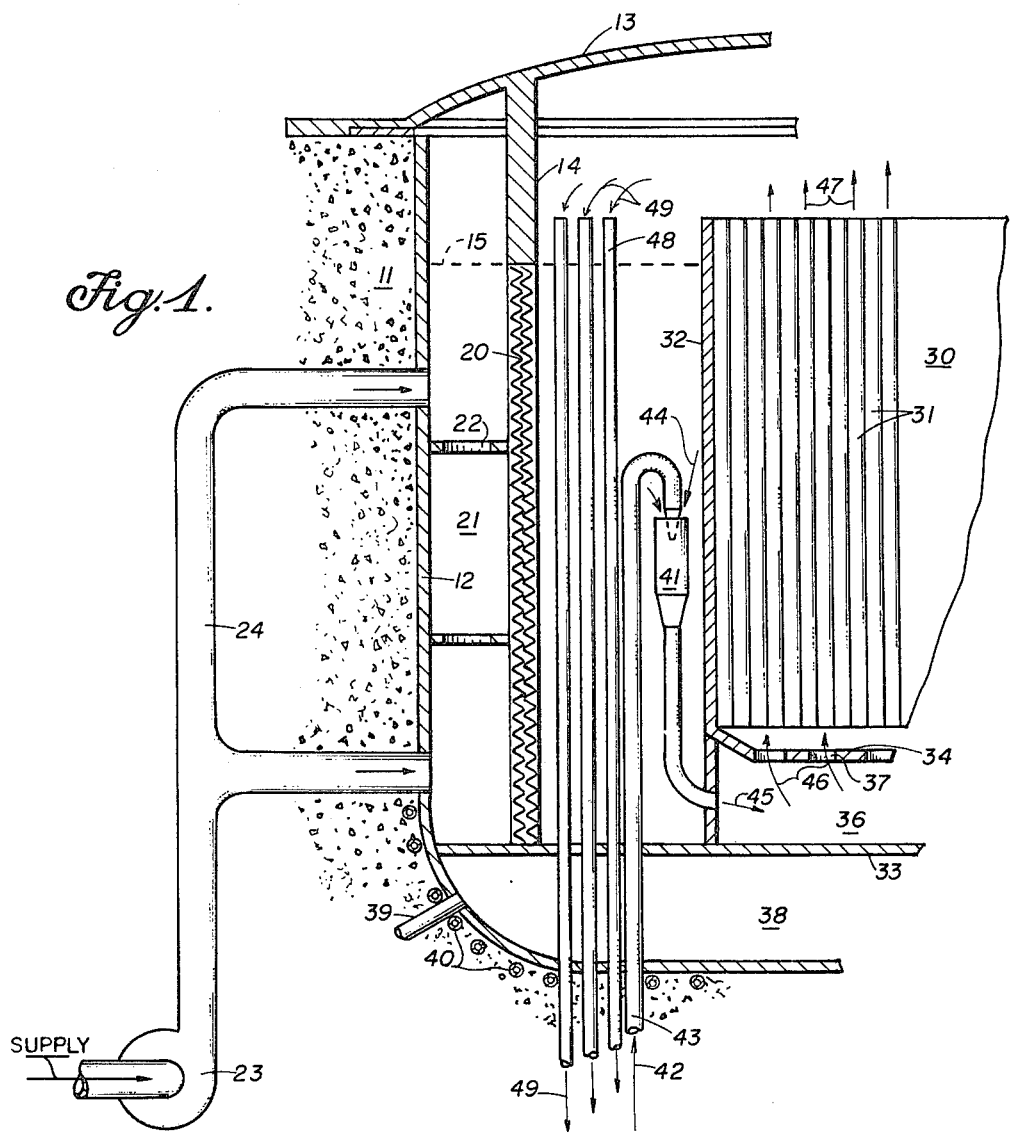

The invention described herein was made in the course of, or under, Contract No. AT(04–3–189, Project Agreement 46 with the United States Atomic Energy Commission.

This invention relates to cooling systems for nuclear reactors, and in particular to a cooling system for reducing the temperature rise of prestressed reinforced concrete reactor pressure vessels.

Pressure vessels used for containing the core of nuclear reactors of the prior art have generally been constructed of heavy steel and other ferrous metals designed to withstand both the high pressures as well as the high temperatures encountered within the core of the reactor.

In many respects prestressed reinforced concrete is ideally suited for use as a means for containing the core of a nuclear reactor, being an inexpensive and easily fabricated material offering combined nuclear radiation shielding and high strength as added features. It is well known, however, that reinforced concrete cannot withstand the high temperatures ordinarily encountered in the pressure vessel region of nuclear reactors without serious loss of strength of the reinforcing of prestressing steel or loss of compressive strength of the concrete itself due to loss of its water of hydration and other deleterious effects caused by overheating. In addition, temperature fluctuations tend to cause cracking or spalling of concrete due to differential thermal expansion of reinforcing steel, cement and aggregate. Furthermore, temperature gradients throughout the mass of concrete will cause differential expansion of the concrete mass producing thermal stresses, further adding to the possibility of cracking.

The temperature level at which these problems begin is generally about 150° C. so that for this reason, in pressurized water, superheated steam, helium gas and sodium or liquid metal cooled reactors where the coolant inlet temperatures are all generally above 160° C., the temperature limit at which concrete can ordinarily be used is exceeded. Generally, under such circumstances, cooling of a reinforced concrete reactor pressure vessel itself would be regarded as essential in prior art practice; however, the provision of such a cooling system, in accordance with conventional practice, introduces other complications.

It is essential that such a cooling system achieve a uniform temperature distribution over the surface of the pressure vessel to avoid any unequal thermal expansion within the mass of the concrete which would produce cracks or spalling that would permit oxygen, moisture or other materials to enter and accelerate the corrosion of the reinforcing steel. For reasons of economy, it is desirable for the cooling system to conserve the heat absorbed in cooling the pressure vessel. A somewhat complicated system exterior to the shield for returning heat to the reactor cooling system would be required in accord with prior art practice.

The system of the present invention overcomes these problems by introducing coolant into the reactor core region through a permeable material heat barrier disposed between the core and the concrete containment vessel to flow in a direction counter to the flow of the heat through the heat barrier so that the containment vessel walls are contacted only by relatively cold coolant. In effect, a cold water plenum is established between the barrier and vessel wall with heating of the coolant in the plenum being minimized by establishment of a high thermal gradient in the barrier by appropriate selection of barrier materials, operating parameters and structural arrangements. Effective cooling of the concrete vessel is thereby obtained as well as simple recovery and recycle of the heat which would ordinarily be lost in the exterior shield.

It is therefore an object of this invention to provide a cooling system for a prestressed reinforced concrete pressure vessel that provides an even temperature distribution within and along the inner surface of the pressure vessel.

It is another object of this invention to provide a cooling system for a prestressed reinforced concrete pressure vessel that maintains the temperature of said vessel below a value detrimental to the concrete or reinforcing material embedded therein.

It is another object of this invention to provide a cooling system for a prestressed reinforced concrete pressure vessel that economizes the heat absorbed in cooling said vessel and returns it to the heat generating device therein.

It is still another object of this invention to provide a cooling system for a prestressed reinforced concrete pressure vessel utilized for containing a nuclear reactor-core or other high pressure, high temperature vapor generator, in which no special heat exchangers are required and which uses a minimum of piping, pumps and other coolant circuit components.

Figure 2:
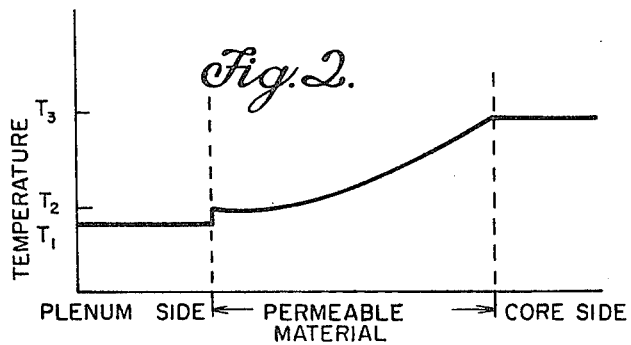

Other and more particular objects of this invention will be manifest upon study of the following detailed description when taken together with the accompanying drawing, in which:

FIGURE 1 is a vertical section through a typical nuclear reactor steam generator, showing the relationship between the concrete pressure vessel, its liner, the permeable material heat barrier, and the reactor core in accordance with the invention; and FIGURE 2 is a graphical illustration showing the typical temperature gradient across the permeable material and adjacent regions of the arrangement of FIGURE 1.

Typically, the cooling system of this invention may be incorporated in a nuclear reactor illustrated in FIGURE 1. Although the reactor shown is of the boiling water type, it can be seen that the cooling system of this invention can easily be adapted by a person of ordinary skill in the art for incorporation in any other type of reactor, i.e., superheated steam, liquid metal cooled or gas cooled reactors.

Basically, the reactor and cooling system shown comprises three portions, a pressure vessel portion, the thermal gradient counterflow cooling system portion, and the reactor-core region portion.

The pressure vessel portion comprises briefly a lower concrete pressure vessel 11 having an inner impermeable vessel liner 12, with a cover member 13 affixed to the lower concrete pressure vessel 11 and liner 12 by bolts, dogs or like means (not shown) common in the art. Cover member 13 is provided about its inner periphery and spaced apart from liner 12 with a depending impermeable flange 14 which abuts permeable barrier 20 of the counterflow cooling system, and which acts to insulate the upper portion of pressure vessel 11 from the steam above waterline 15.

The thermal gradient counterflow cooling system which will be described in greater detail, infra, comprises basically a permeable barrier 20 spaced apart from vessel liner 12 to define plenum 21 which extends the full circumference about the interior of the pressure vessel portion described above. Spacer braces 22 are used to support and maintain the spaced apart relation between permeable barrier 20 and vessel liner 12. Coolant is directed into plenum 21 by coolant pump 23 through coolant conduit 24.

The reactor-core region portion of the illustrated reactor comprises basically a core 30 having vertically oriented cooling channels 31 situated in the usual fashion between fuel elements (not shown) and control rods (not shown) common in the art. Core 30 is concentrically enclosed in a core containment barrier 32 which extends down to transverse bottom support barrier 33. At the bottom of core 30 and affixed to vertical containment barrier 32 is core support plate 34 which is spaced apart from transverse support barrier 33 to define plenum 36. Openings 37 are provided in core support plate 34 to permit coolant to flow from plenum 36 up through channels 31 of core 30.

Transverse barrier 33 is affixed to the vertical rising sides of liner 12, but is also spaced apart from the horizontal bottom portion of liner 12 to define plenum 38. Plenum 38 is filled with coolant from conduit 39, and provides thermal insulation for the bottom of the reactor vessel. Adequate cooling for the bottom of vessel 11 is provided through coils 40 embedded therein adjacent to liner 12. The upper portion of vessel 11 which is not exposed in direct contact with coolant in plenum 21 could likewise be cooled.

Coolant is supplied to core 30 by means of a plurality of jet pumps 41, distributed peripherally about the exterior of containment barrier 32. Coolant flows into the core 30 not only from a coolant supply (not shown) exterior to the reactor, as indicated by arrow 42 through conduit 43, but also from the body of coolant within the reactor defined by waterlevel line 15, in the intake of jet pumps 41 as indicated by arrows 44. The combined coolant, as indicated by arrow 45, enters plenum 36 which it passes up through openings 37, indicated by arrows 46, to be converted into steam which is exhausted out of the top of core 30, as indicated by arrows 47. The steam above waterlevel line 15 then passes into a plurality of conduits 48, extending from above waterlevel line 15 through bottom portions of vessel 11 as indicated by arrows 49, and passes out of the reactor to power conversion or generating means (not shown).

In detail, the structure of the thermal gradient counterflow cooling system of this invention comprises an elongated, annular liquid or gas coolant permeable material heat barrier 20, interposed between the pressure vessel 11 and liner 12 portion and the higher temperature core region portion containing reactor core 30. As previously described permeable material 20 is spaced apart from liner 12 to define plenum 21 into which coolant flows from pump 23 through conduit 24, so that the pressure in plenum 21 is greater than the pressure in the core region portion of the reactor on the other side of barrier 20. This provision results in a flow of coolant which is counter to the flow of heat through barrier 20 from the heated coolant in contant with the interior thereof to effectively insulate said vessel from the core region portion of the reactor containing core 30 which may operate at temperatures of the order of 542° F. and at 1000 p.s.i. with water coolants.

Due to the efficiency of the cooling system herein, the reinforced or prestressed concrete pressure vessel 11 may be designed in accordance with usual engineering practice and safety code requirements with due regard to the pressures involved and at substantially ambient temperatures, i.e., below usual maximum operating temperatures of about 150° C.

Permeable barrier 20 is arranged as noted above in generally concentric spaced apart relation with liner 12, to define a plenum 21. Liner 12 covers the entire inside surface of generally cylindrical closed bottom portion of said concrete vessel 11, to provide a gas or liquid coolant impermeable membrane to prevent the coolant material from reacting with, or dissolving, the concrete, and to minimize contamination of the coolant. In addition, liner 12 is used to prevent cracks which may develop in the concrete from propagating through to the inner surface of the vessel as a safeguard to prevent the escape of coolant or radioactive material. Permeable material barrier 20 is held in place in this embodiment by means of a plurality of spacer means 22 which are shown in FIGURE 1 as brackets, but may be any means common in the art which will both support permeable material barrier 20 and maintain a spaced apart relation with liner 12.

Plenum 21 is entirely closed so that all of the coolant entering plenum 21 must exit through permeable material 20. The bottom portion of plenum 21 is sealed off by transverse bottom barrier 33 which is affixed both to liner 12, as noted supra, and permeable barrier 20. The upper portion of plenum 21 is sealed off by the peripheral edge of cover means 13 and its dependent flange 14 which abutts permeable barrier 20.

It should be noted that waterline 15 is maintained near the upper edge of permeable barrier 20 to provide a constant differential pressure across barrier 20. Since coolant in plenum 21 is subjected to a differentially higher pressure than the pressure in the core region portion of the reactor by means of pump 23, a difference in waterlevel and pressure would result if no impermeable barrier were placed above permeable barrier 20 to separate the regions on both sides of the barrier 20 above waterline 15. This would result in a decrease in the flow rate of coolant through barrier 20 with height along barrier 20. Such variation in coolant flow rate with height would result in thermal stresses in barrier 20 because of the unequal rate of heat removal from the material in the barrier, as well as possibly allowing localized overheating.

Permeable barrier 20 can be of any structural substance of limited thermal conductivity, provided a large plurality of relatively small cross section closely spaced channels or other passages permitting liquid or gas coolant to flow, with uniform distribution and rate, through the material and at the same time permit thermal energy to be transferred from the permeable material to the coolant material. For example, in the case of gas-cooled reactors, porous carbon or graphite would be satisfactory. In the present embodiment, however, wherein a water-cooled reactor core is shown, for example, light water is used as the coolant material, and in such case it has been found that permeable metallic membranes or sheets of sintered stainless steel random wire mesh, stainless steel foil, sintered stainless steel powder, sintered stainless teel woven wire mesh or honeycomb or spaced sheet or foil laminated material in which the cells or lamination spacings are parallel to the direction of flow of coolant and heat, as well as other varieties of the above materials bonded by other means, will operate satisfactorily. Generally speaking, the thermal conductivity of the barrier is minimized and the thermal gradient maximized by using metals or other barrier material, e.g., stainless steel, having poor thermal conductivity. The thermal gradient is further enhanced by selecting a permeable barrier material which provides a relatively small cross sectional channel area relative to effective channel length therein. Such a relationship of average channel cross sectional area to length may be provided by the sinuous channel paths through the various stainless steel wire, powdered metal and similar structural materials mentioned above. Where sinuous or tortuous channel passages cannot be provided as with stainless steel foil packs, honeycomb, i.e., polycellular matrices, e.g., Hexcel, and other more or less direct channel type structures, the desired relationship can be obtained by using close spacing of foil sheets, small diameter honeycomb cells, etc.

From the standpoint of space considerations, barrier thicknesses of the order of 1″ to 2″ are preferred; however, thicknesses somewhat more can be used. Suitable materials can be selected on the basis of certain general criteria. The barrier should provide some significant resistance to fluid flow to provide a pressure differential across the barrier to assure substantial uniform flow in all regions. Porosities, i.e., ratios of open-to-closed area in the range of 40 to 80% can generally be employed. For random or woven wire mesh, wire diameter can range between .010 and .050 inch. A differential of pressure 0.5 p.s.i. to 5 p.s.i. will generally suffice. This pressure differential is achieved by utilizing a flow rate of coolant from plenum 21 through barrier 20 at least sufficient to maintain the outer surface of barrier 20 below the selected maximum operating temperature, e.g., 150° F., in plenum 21, while the core region is at normal operating temperature, e.g., 542° F. The thermal conductivity of the barrier materials is also a consideration; however, it will be noted that the highly effective countercurrent heat extraction provided by the foregoing arrangement can minimize this factor even with materials having significant heat conductivity.

To operate the cooling system of this invention, coolant supply pump 23 is actuated by a driving means (not shown) to pump coolant into plenum 21 through conduit 24. Flow of coolant through multiple distributed openings from conduit 24 into various locations in plenum 21 assure uniform coolant temperature therein. From plenum 21, the coolant enters permeable barrier 20 wherein it is heated by countercurrent extraction of heat and thence passes into the higher temperature region containing core 3. It must be observed that the cooling system of the present invention is arranged ancillary to but fluidly connected to the primary coolant system of the reactor to operate for the specific purpose of maintaining concrete pressure vessel 11 at a temperature below the point that will be injurious to the concrete or reinforcing of pressure vessel 11, and at the same time achieve countercurrent heat exchange to preheat the portion of reactor coolant passing therethrough for delivery to the core region.

The rate of cooling of barrier 20 will be a function not only of the temperature difference between the coolant and the material of barrier 20, but also the rate at which the coolant passes through barrier 20. This rate is a function of both the pressure difference between the plenum 21 and core region on opposite sides of barrier 20 and the porosity or permeability of the material of barrier 20. Since the porosity of the permeable barrier for a given case is usually fixed in a constructed reactor, a variation in pressure difference or other flow regulating expedient must be used to regulate coolant flow through barrier 20. This regulation is accomplished by adjusting the driving means (not shown) of pump 23 to apply greater or lesser energy to pump 23. It has been found that the pressure drop is approximately proportional to the square of the flow rate.

The thermal energy in barrier 20 causing its temperature rise and from which vessel 11 must be isolated is predominantly derived from two sources: (1) the conventional thermal heat transfer mechanisms of thermal radiation, conduction and convection from core 30, and/or coolant in the region surrounding core 30; and (2) the energy liberated upon absorption or moderation of gamma radiation and neutrons in the barrier material and coolant therein. The primary source of thermal energy of concern herein is generally found to come from convection and conduction processes.

The conventional heat transfer mechanisms of the coolant flowing countercurrent to the heat flow will result in a steep temperature gradient across barrier 20 with a high temperature on the core region side of the barrier and a low temperature on the plenum 21 side. Such a temperature gradient is illustrated in FIGURE 2 and is found to be a logarithmic function. Since the energy liberated upon absorption of gamma radiation and neutrons is generally at a quite uniform low level over the whole cross section of barrier 20, the temperature rise from this heat source will be uniform and, in the practical sense, relatively small, so that when superimposed upon the temperature gradient from the conventional heat transfer mechanisms, the gamma radiation as a heat source will shift the temperature gradient curve due to radiation, conduction and convection only slightly upward.

Thus the coolant, at a temperature of, say $T_1$, will be present at the plenum side of barrier 20, which barrier side is at a temperature $T_2$, slightly elevated over $T_1$ by minimal heat transfer through barrier 20. As the coolant continues its journey through the low open cross section sinuous pores or channels of permeable barrier 20, it will absorb heat from barrier 20 and its temperature will thus be raised. Because of the temperature gradient across barrier 20, there will always be a small but finite temperature difference between the coolant and barrier 20, thus affording high efficiency in heat transfer to the coolant, even though the coolant temperature is also rising. When the coolant reaches the core region side of permeable heat barrier 20, its temperature will have risen to $T_3$, which is also the temperature of the primary coolant in core region, and the coolant enters the core region to intermix with primary coolant therein without lowering the primary coolant temperature. It can thus be seen that the energy originally entering barrier 20 from the core region side of barrier 20 is returned to the reactor core system by this means and not wasted through exterior heat exchangers.

To illustrate an embodiment of this invention, Table I lists the parameters of a typical thermal gradient counterflow cooling system in accordance with the invention, any may be applied to containing a nuclear reactor core of a typical boiling water or pressurized water reactor.

*Table I*

Permeable Barrier—Stainless Steel Woven Wire Mesh (vertical wire diameter .023″; horizontal wire diameter .016″.
Permeable Barrier Thickness—2 inches.
Permeable Barrier Porosity—50% (50% open area–50% solid area).
Coolant Flow Rate—60 lb./hr./S.F.
Pressure Drop Across Permeable Barrier—2–4 p.s.i.
Coolant Inlet Temperature $T_1$—100° F.
Permeable Material Temperature:
    Plenum Side $T_2$—150° F.
    Reactor Core Side $T_3$—542° F.
(Coolant leaves reactor core side at same temperature)

The heat removed from permeable material can be calculated from the following equation:

$$G \times C \times \Delta T = Q$$

where
$G$=Coolant mass flow rate in lb./hr./S.F.
$C$=Specific heat of the coolant material.
$\Delta T = T_1 - T_3$, the temperature increase of the coolant in ° F.
$Q$=Heat removed in B.t.u./hr./S.F.

The above example given in Table I illustrates the results obtained when using stainless steel woven wire mesh. Similar results are obtained when a random wire mesh such as compressed stainless steel wool or laminar or honeycomb material wherein the laminations or cells are parallel to the flow of coolant and heat are used. It has been found, however, that the woven wire mesh gives more satisfactory results.

Although the foregoing embodiment has been described in detail, there are obviously many other embodiments and variations in configuration which can be made by a person skilled in the art without departing from the spirit, scope or principle of this invention. Therefore, this invention is not to be limited except in accordance with the scope of the appended claims.

What is claimed is:

1. In a nuclear reactor having a central fissile fuel filled core and a primary coolant system therethrough, the combination comprising an outer reinforced concrete pressure vessel means having access port means, a coolant impermeable liner disposed along the inner surface of said pressure vessel means, a barrier positioned within said pressure vessel means and in a spaced relation to said impermeable liner defining a plenum therebetween, said barrier being composed of coolant permeable and highly porous material, and means for supplying coolant to said closed plenum through said access port means in said pressure vessel means and apertures in said impermeable liner, said coolant supplying means being constructed to supply coolant to said plenum with sufficient pressure to force said coolant from said closed plenum through said permeable barrier.

2. An apparatus as defined in claim 1, wherein said permeable barrier highly porous material comprises a material providing fluid flow resistance sufficient to maintain a temperature gradient of at least 300° F. at a pressure difference of at least ½ pound per square inch between the plenum side of said barrier and the heat source side of said barrier.

3. An apparatus as defined in claim 2, wherein said permeable barrier material is a stainless steel body comprising wires having diameters between .010 inch and .050 inch, compressed to have a ratio of open area to closed area of between 40% and 80%.

4. An apparatus as defined in claim 2, wherein said permeable barrier is porous stainless steel.

5. An apparatus as defined in claim 2, wherein said permeable material comprises woven wire mesh.

6. The combination defined in claim 1, wherein said permeable barrier is positioned in said pressure vessel means in relationship to the primary coolant system for the reactor core such that the coolant of said primary coolant system at least covers a surface of said permeable barrier adjacent thereto, whereby a constant differential pressure is maintained across said permeable barrier by said coolant supplying means and said primary coolant system such that coolant from said primary coolant system is substantially prevented from entering said plenum.

References Cited

UNITED STATES PATENTS

| | | | |
|---|---|---|---|
| 2,215,532 | 9/1940 | Richardson | 176—87 |
| 2,893,703 | 7/1959 | Richardson | 165—47 |
| 2,908,455 | 10/1959 | Hoadley | 62—315 |
| 2,997,435 | 8/1961 | Millar et al. | 176—87 |
| 3,138,009 | 6/1964 | McCreight | 62—315 |
| 3,175,958 | 3/1965 | Bourgade | 176—87 |
| 3,322,639 | 5/1967 | Davidson | 176—87 |

FOREIGN PATENTS 1,408,372  7/1965  France.

REUBEN EPSTEIN, *Primary Examiner.*